United States Patent
Seymour

(10) Patent No.: US 7,984,428 B1
(45) Date of Patent: Jul. 19, 2011

(54) METHODS AND SYSTEMS FOR TESTING EVALUATION MODULES

(75) Inventor: Brian Seymour, Merrimack, NH (US)

(73) Assignee: United Business Media LLC, Manhasset, NY (US)

( * ) Notice: Subject to any disclaimer, the term of this patent is extended or adjusted under 35 U.S.C. 154(b) by 1113 days.

(21) Appl. No.: 10/853,718

(22) Filed: May 26, 2004

(51) Int. Cl.
*G06F 9/44* (2006.01)

(52) U.S. Cl. ............ 717/125; 717/126; 717/127; 726/4; 726/28; 726/29

(58) Field of Classification Search .......... 717/124–126, 717/134–135; 709/208–211
See application file for complete search history.

(56) References Cited

U.S. PATENT DOCUMENTS

| | | | |
|---|---|---|---|
| 5,353,243 A | 10/1994 | Read et al. | |
| 5,367,667 A | 11/1994 | Wahlquist et al. | |
| 5,625,580 A | 4/1997 | Read et al. | |
| 5,630,049 A * | 5/1997 | Cardoza et al. | 714/25 |
| 5,664,115 A | 9/1997 | Fraser | |
| 5,669,000 A | 9/1997 | Jessen et al. | |
| 5,671,280 A | 9/1997 | Rosen | |
| 5,699,528 A | 12/1997 | Hogan | |
| 5,732,400 A | 3/1998 | Mandler et al. | |
| 5,742,754 A * | 4/1998 | Tse | 714/38 |
| 5,745,884 A | 4/1998 | Carnegie et al. | |
| 5,861,882 A | 1/1999 | Sprenger et al. | |
| 5,874,960 A * | 2/1999 | Mairs et al. | 715/733 |
| 5,958,007 A | 9/1999 | Lee et al. | |
| 6,119,247 A | 9/2000 | House et al. | |
| 6,134,516 A | 10/2000 | Wang et al. | |
| 6,154,128 A | 11/2000 | Wookey et al. | |
| 6,199,193 B1 | 3/2001 | Oyagi et al. | |
| 6,223,292 B1 | 4/2001 | Dean et al. | |
| 6,260,160 B1 | 7/2001 | Beyda et al. | |
| 6,268,855 B1 * | 7/2001 | Mairs et al. | 715/784 |
| 6,271,839 B1 * | 8/2001 | Mairs et al. | 715/807 |
| 6,285,363 B1 * | 9/2001 | Mairs et al. | 715/751 |
| 6,311,149 B1 | 10/2001 | Ryan et al. | |
| 6,320,006 B1 | 11/2001 | Murata et al. | |
| 6,385,739 B1 | 5/2002 | Barton et al. | |
| 6,412,106 B1 | 6/2002 | Leask et al. | |
| 6,449,653 B2 | 9/2002 | Klemets et al. | |
| 6,598,223 B1 | 7/2003 | Vrhel et al. | |
| 6,618,854 B1 * | 9/2003 | Mann | 717/124 |
| 6,662,221 B1 | 12/2003 | Gonda et al. | |

(Continued)

OTHER PUBLICATIONS

"Real Time Streaming Protocol (RTSP) Request for Comments: 2326," H. Schulzrinne et al., The Internet Society (Apr. 1998) available at http://www.ietf.org/rfc2326.txt?number=2326. (Accessed on Feb. 6, 2002).

(Continued)

*Primary Examiner* — Lewis A Bullock, Jr.
*Assistant Examiner* — Michael Yaary
(74) *Attorney, Agent, or Firm* — Finnegan, Henderson, Farabow, Garrett & Dunner, LLP

(57) ABSTRACT

A system consistent with this invention evaluates the performance of a module via a network. Such a system comprises an evaluation module, an evaluation module computer running an end user interface for interfacing with the evaluation module computer, wherein the evaluation module computer evaluates the performance of the module, a terminal linked to the evaluation module computer through a network, wherein the terminal displays the end user interface, and a shadow terminal linked to the evaluation module computer through a network, wherein the shadow terminal displays the end user interface.

15 Claims, 7 Drawing Sheets

U.S. PATENT DOCUMENTS

| | | | | |
|---|---|---|---|---|
| 6,708,327 | B1* | 3/2004 | Aliphas | 717/125 |
| 6,728,753 | B1 | 4/2004 | Parasnis et al. | |
| 6,802,019 | B1 | 10/2004 | Lauder | |
| 6,934,766 | B1 | 8/2005 | Russell | |
| 2002/0000990 | A1* | 1/2002 | Schauser | 345/504 |
| 2002/0152456 | A1 | 10/2002 | Nightingale et al. | |
| 2004/0003279 | A1* | 1/2004 | Beilinson et al. | 713/200 |
| 2005/0138426 | A1* | 6/2005 | Styslinger | 713/201 |

OTHER PUBLICATIONS

Bøegh, Jørgen, "Evaulation Modules: The Link Between Theory and Practice," IEEE, 1995. pp. 170-174.

Wertz, "The Design of an Integrated, Interactive and Incremental Programming Environment," IEEE, 1982, pp. 157-165.

Microsoft Press, Computer Dictionary, Third Edition, 1997, p. 210.

U.S. Appl. No. 10/736,224, filed Dec. 16, 2003.

U.S. Appl. No. 10/361,921, filed Feb. 11, 2003.

U.S. Appl. No. 10/902,428, filed Jul. 30, 2004.

Office Action mailed Jul. 29, 2008 in U.S. Appl. No. 10/902,428.

Final Office Action mailed Dec. 10, 2008 in U.S. Appl. No. 10/902,428.

Office Action mailed Sep. 28, 2007 in U.S. Appl. No. 10/902,428 (6 pages).

Office Action mailed Dec. 31, 2008 in U.S. Appl. No. 10/902,428 (7 pages).

Final Office Action mailed Apr. 24, 2009 in U.S. Appl. No. 10/902,428 (6 pages).

Office Action mailed Oct. 1, 2009, in U.S. Appl. No. 10/902,428 (8 pages).

* cited by examiner

METHODS AND SYSTEMS FOR TESTING EVALUATION MODULES

FIELD OF THE INVENTION

Methods and systems consistent with the invention evaluate the performance of electronic, software, and computer modules, and in particular evaluate electronic, software, and computer modules remotely over a network.

BACKGROUND OF THE INVENTION

Electronic and software companies such as Texas Instruments, Analog Devices, Motorola, and Intel provide their business-to-business customers with "evaluation modules" ("EVM's") so the customers can evaluate the EVMs. EVMs may be hardware components or software components. For example, if Texas Instruments made a new graphics chip, a game software company may want to evaluate their game software on the new graphics chip. The evaluation would help determine if the new graphics chip met the need of the game software company. Typically, Texas Instruments would provide the game software company with the new graphics chip, i.e., an EVM, for evaluation purposes. Sometimes EVM's are manufactured and lent to customers for evaluation. Other times, EVMs are used to train existing and potential customers on the product. EVMs, however, can be expensive, and their physical distribution to potential customers is time consuming and slowed down the evaluation process. Thus, providing each of many customers with an expensive EVM can be costly.

To avoid this cost, TechOnLine, the assignee of the current application, has provided the ability for customers to evaluate software and hardware (EVMs) remotely. As a result, customers can evaluate an EVM remotely without purchasing or otherwise obtaining the EVM. U.S. Pat. No. 6,708,327 ("the '327 patent"), entitled "System for Accessing and testing Evaluation Modules via a Global Computer Network," assigned to the same assignee as this current application, hereby incorporated by reference, describes testing EVMs remotely.

Systems consistent with the '327 patent provide customers with access via a computer network (such as the Internet) to EVMs such as electronic, software, and hardware components. Customers can then evaluate or be trained how to use the EVMs remotely. There is a need, however, to provide more flexibility for evaluating evaluation modules.

SUMMARY OF THE INVENTION

A system consistent with this invention evaluates the performance of a module via a network. Such a system comprises an evaluation module, an evaluation module computer running an end user interface for interfacing with the evaluation module computer, wherein the evaluation module computer evaluates the performance of the module, a terminal linked to the evaluation module computer through a network, wherein the terminal displays the end user interface, and a shadow terminal linked to the evaluation module computer through a network, wherein the shadow terminal displays the end user interface.

Both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference is now made in detail to the present embodiments of the invention, examples of which are illustrated in the accompanying drawings. Wherever possible, the same reference numbers are used throughout the drawings to refer to the same or like parts.

Figure 1:
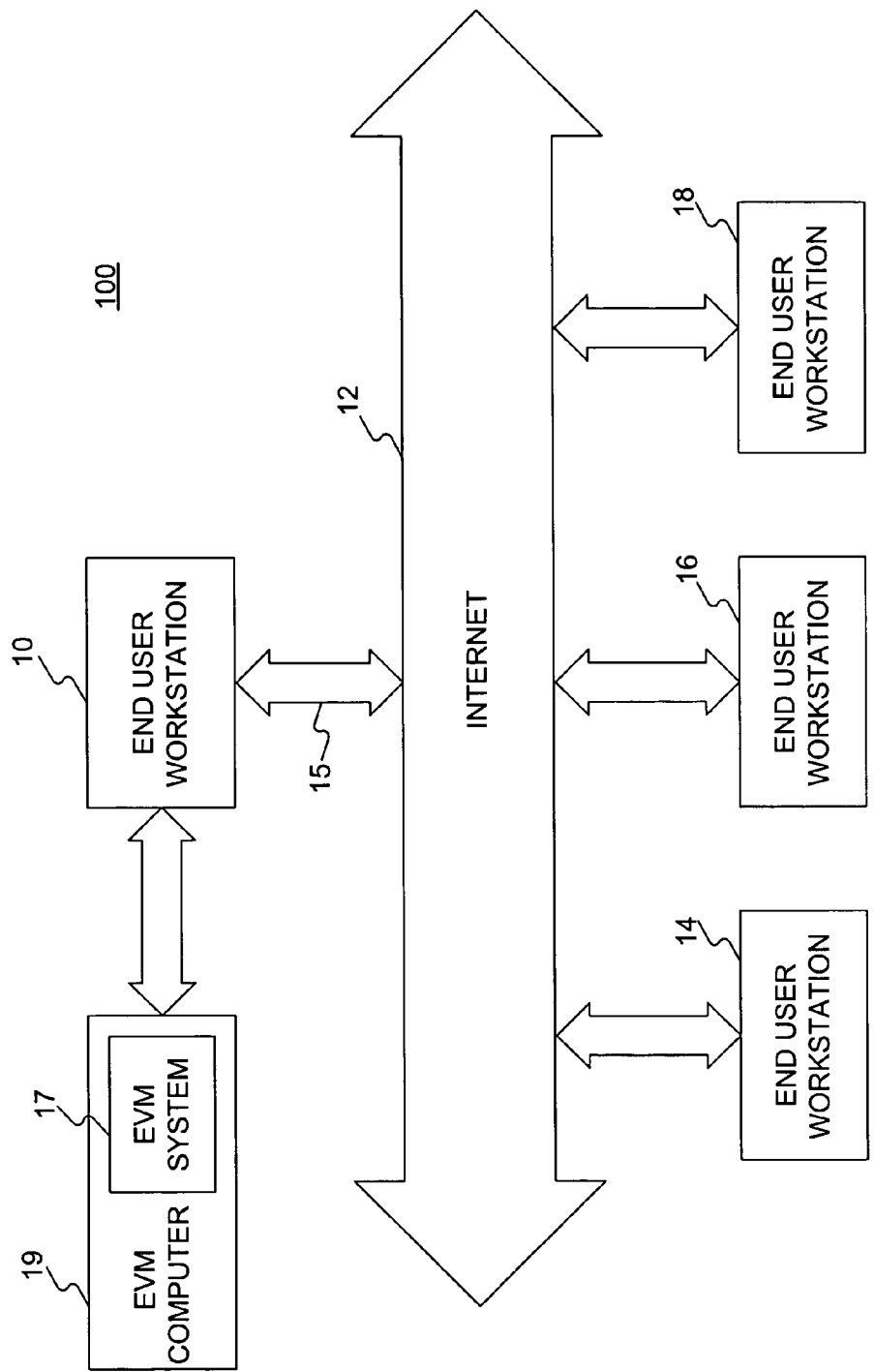
FIG. 1 is a block diagram of an evaluation network consistent with the invention.

FIG. 1 is a block diagram of an evaluation network 100 consistent with the invention. Network 100 comprises end user workstation 14, end user workstation 16, end user workstation 18, Internet 12, central system 10, EVM computer 19 and EVM system 17. EVM computer 19 may also be referred as "target computer 19." End user workstations 14, 16, and 18 may be used by the "customers" of the manufacturers of the EVM systems, meaning that the customers are the "end users." Internet 12 may take the form of any other type of network, such as, for example, a local area network (LAN), a wide area network (WAN), a token ring network, or an Ethernet. End user workstations 14, 16, and 18 are terminals or computers linked to Internet 12. Any of end user workstation 12, 16, or 18 may also comprise a network. Central system 10 may comprise a network, such, for example, as a LAN or WAN. End user workstations 14, 16, and 18 may also be termed simply "workstations 14, 16, and 18." EVM system 17 may be hardware component or module or a software component or module. Further, in the embodiment of FIG. 1, EVM computer 19 comprises EVM system 17.

Central system 10 connects to Internet 12 via a link 15. Central system 10 is further connected to EVM computer 19. Network 100 comprising central system 10, EVM computer 19, and EVM system 17, may be known as a "VirtuaLab," which is a trademark of the assignee of this application.

EVM system 17 represents the component or module to be evaluated by an end user using one of workstations 14, 16, or 18. EVM computer 19 provides an environment for EVM system 17 to operate, including, for example, providing power to EVM system 17 if it requires power. In the embodiment in FIG. 1, there is only one EVM computer 19 and one EVM system 17. In other embodiments, however, there may be more than one EVM computer 19 and more than one EVM system 17. For example, there may be one or more EVM computers and one or more EVM systems for Texas Instruments; and one or more EVM computers and one or more EVM systems for Intel. In one embodiment, there is one EVM computer for each EVM system, but in other embodiments, there are multiple EVM systems for each EVM computer, or multiple EVM computers for each EVM system.

Figure 2:
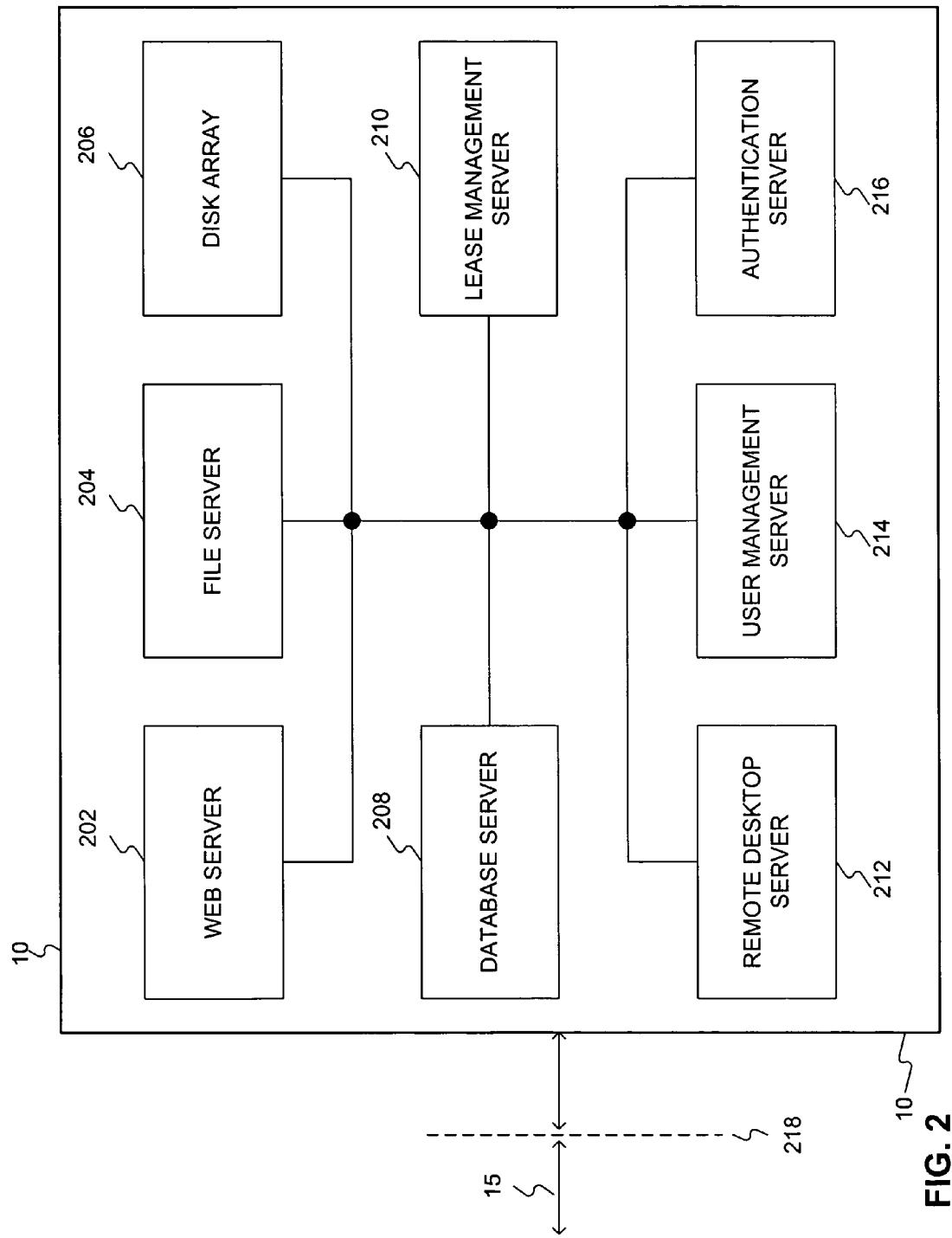
FIG. 2 is a block diagram of the central system of FIG. 1.

FIG. 2 is a block diagram of central system 10 of FIG. 1. Central system 10 comprises a web server 202, a file server 204, a disk array 206, a database server 208, a lease management server 210, a remote desktop server 212, a user management server 214, and an authentication server 216. Link 15 may connect to central system 10 through a firewall 218 for added security. All the servers in central system 10 may operate under a Unix Operating System such as Linux, but may also operate under a Windows NT system, SUN Solaris 2.6, or any other operating system. Further, all the servers in central system 10 may be connected in a network, such as, for example, a LAN or WAN.

Web server 202 sends information to workstations 14, 16, or 18. Web server 202 comprises a web subsystem that connects to a web browser situated in one of workstations 14, 16, or 18. In one embodiment, web server 202 operates Apache 1.3.1 software by Apache Group which includes a high performance web server, an application development environment, integrated full-text searching, multimedia streaming, and site management tools. The Apache 1.3.1 software package also has support for HTTP, Java, and Telnet compatible browsers. One embodiment of the invention uses the World Wide Web (WWW) over the Internet, although other network environments may be used.

End users may schedule evaluation time for evaluating EVM system 17. When an end user schedules evaluation time, the end user "leases" time on EVM computer 19 to evaluate EVM system 17. Lease management server 210 comprises the logic necessary to grant or not grant leases when an end user requests a lease. Database server 208 comprises data related to end users, leases, and "platforms." A platform is an EVM computer and EVM system pair. For example, in the embodiment of FIG. 1, EVM computer 19 and EVM system 17 comprise one "platform."

Authentication server 216 authenticates end users. Authentication is process of identifying an individual, usually based on a username and password. Authentication merely ensures that the individual is who he or she claims to be, but says nothing about the access rights of the individual. In security systems, authentication is distinct from authorization, which is the process of giving individuals access to system objects based on their identity. Authentication server 216 makes information, such as system objects, in file server 204 available after an end user is authenticated and authorized.

User management server 214 provides user authorization. User management server 214 comprises a lightweight directory access protocol ("LDAP"). LDAP is a set of open protocols for accessing information directories. LDAP supports TCP/IP and makes it possible for an application running to obtain directory information, such as e-mail addresses and public keys. User management server 214 comprises end user information to determine what end users can and cannot do in central system 10. In other words, user management server 214 authorizes an authenticated user to perform "privileged" tasks.

Database server 208 processes database queries. In one embodiment, database server 208 uses an SQL database management software from Microsoft Corporation. In another embodiment database server 208 uses Oracle 8 database management system from Oracle Corporation, which provides scaleability. The database server 208 may be any SQL based database management system. Database server 208 may store information pertaining to end users, administrator accounts, as well as end user profile criteria. Database server 208 may also store client account information such as account balances, member profiles, and event information such as demonstrations. Database server 208 may be a dual processor computer optimized specifically for the Oracle 8 threading model. Database server 208 may require additional processors in high volume environments.

File server 204 is dedicated to storing files, processing queries for files, and obtaining files from disk array 206. Disk array 206 provides disk storage for web server 202, file server 204, database server 208, lease management server 210, remote desktop server 212, user management server 214, and authentication server 216. File server 204 may provide every end user with network storage space. The end user storage space may be available no matter what workstation 14, 16, or 18 the end user decides to use. Further, the end user storage space may be available no matter which EVM system the end user is evaluating, if there are multiple EVM systems.

Figure 3:
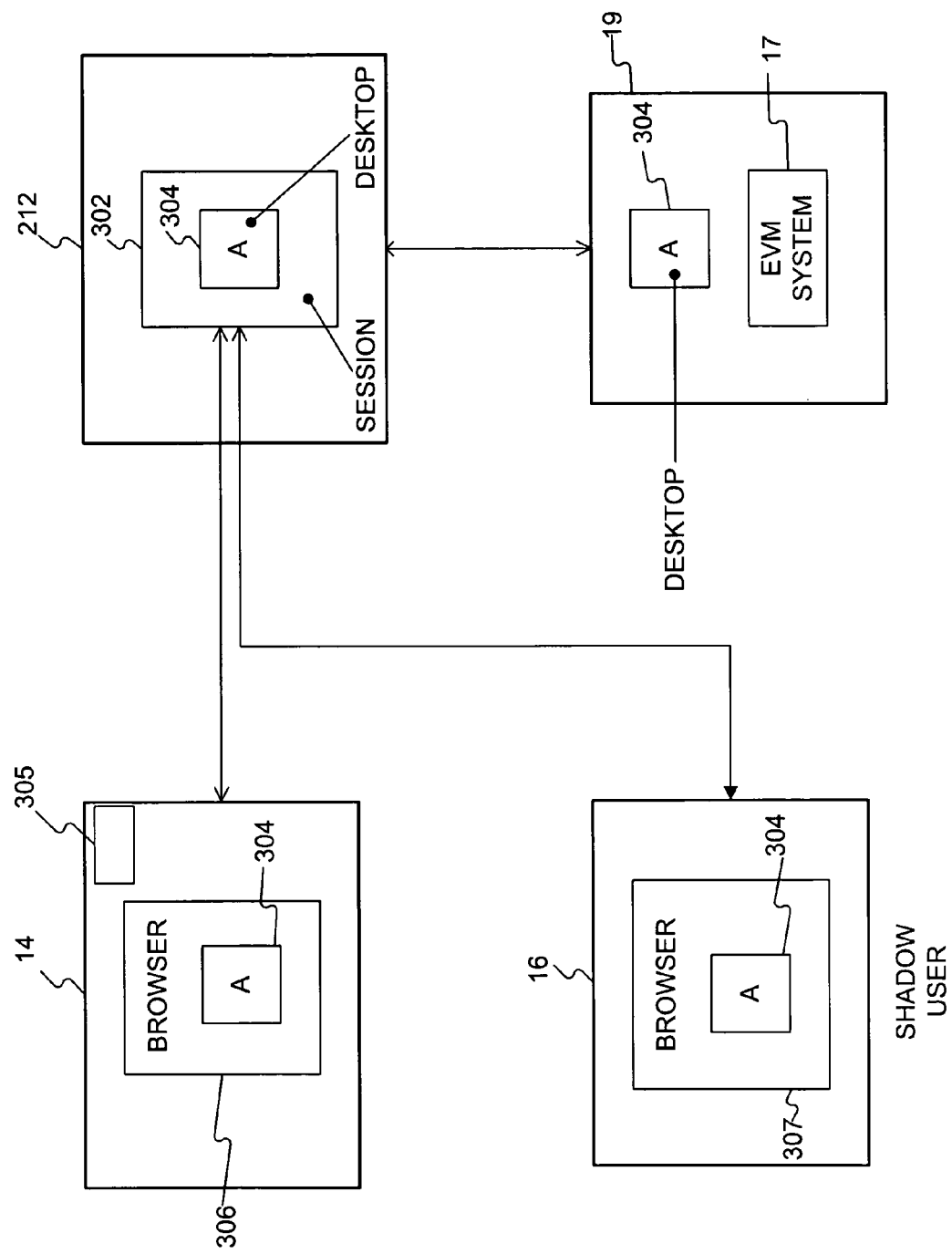
FIG. 3 is a block diagram of remote the desktop server, the EVM computer, the EVM system, the end user workstations, all of FIG. 2.

FIG. 3 is a block diagram of remote desktop server 212, EVM computer 19, EVM system 17, workstation 14, and workstation 16. EVM computer 19 contains an EVM system 17 which runs programs such as debugger programs. EVM computer 19 may also run software provided by the manufacturer of EVM system 17 to control and operate EVM system 17, for example. EVM computer 19 may include "interconnection software" including FTP servers and clients. Communication between remote desktop server 212 and EVM computer 19 may be controlled by telnet servers and HTML servers, for example. Such software programs may run in EVM computer 19 in a desktop environment, such as in desktop 304 showing "A." The meaning of an "end user interface" includes a "desktop environment." Desktop 304 may show the frames and windows for evaluating EVM system 17 and interfacing with EVM computer 19. The desktop environment may be a windows operating system such as Windows 2000 or Windows NT, for example.

Remote desktop server 212 is linked to EVM computer 19 and EVM system 17. Remote desktop server runs "sessions" such as session 302. A session may interact with EVM computer 19. Workstation 14 may open session 302 in remote desktop server 212 to evaluate EVM system 17. Remote desktop server 212 runs desktop 304, showing "A," in session 302.

In this embodiment, workstation 14 opens a browser 306 and desktop 304 appears in browser 306, showing "A." An end user, such as an engineer for example, may access a storage device 305 in workstation 14 through desktop 304 because session 302 may "map" storage device 305 to an input/output port running in session 302. In the embodiment of FIG. 3, an end user may operate session 302 from workstation 14 as though he were sitting at remote desktop server 212. Further, an end user may operate desktop 304 from workstation 14 as though he were sitting at EVM computer 19. Remote desktop server may also map storage space from file server 204 to desktop 304 in session 302.

In methods and systems consistent with the invention, end user workstation 16 may also connect to session 302. End user workstation 16 opens a browser 307 and desktop 304 appears in browser 307, showing "A." An end user, such as an supervisor engineer for example, may access a storage device 305 in workstation 14 through desktop 304 because session 302 may "map" storage device 305 to an input/output port running in session 302. Thus, the supervisor engineer at workstation 16, for example, may have access to the storage device 305 in workstation 14.

In the embodiment of FIG. 3, an end user may operate session 302 from workstation 16 as though he were sitting at remote desktop server 212. Further, an end user may operate desktop 304 from workstation 16 as though he were sitting at EVM computer 19. Thus, workstation 16 "shadows" workstation 14 and may be called a "shadow terminal." This allows the engineer at workstation 14, for example, to demonstrate a test to his supervisor engineer at workstation 16. Workstation 16 is the "shadow" workstation and the supervisor engineer at workstation 16 is the "shadower." The engineer at workstation 14 may have the ability to deny "shadow" access to workstation 16 or turn off the "shadow" access of workstation 16.

Workstation 14, workstation 16, remote desktop device 212, and EVM computer 19 may use the software program Secure Global Desktop Enterprise Edition by Tarentella. Alternatively, workstation 14, workstation 16, remote desktop device 212, and EVM computer 19 may use the software program Citrix MetaFrame Access Suite by Citrix corporation. Other remote desktop application software programs may be used.

Figure 4A:
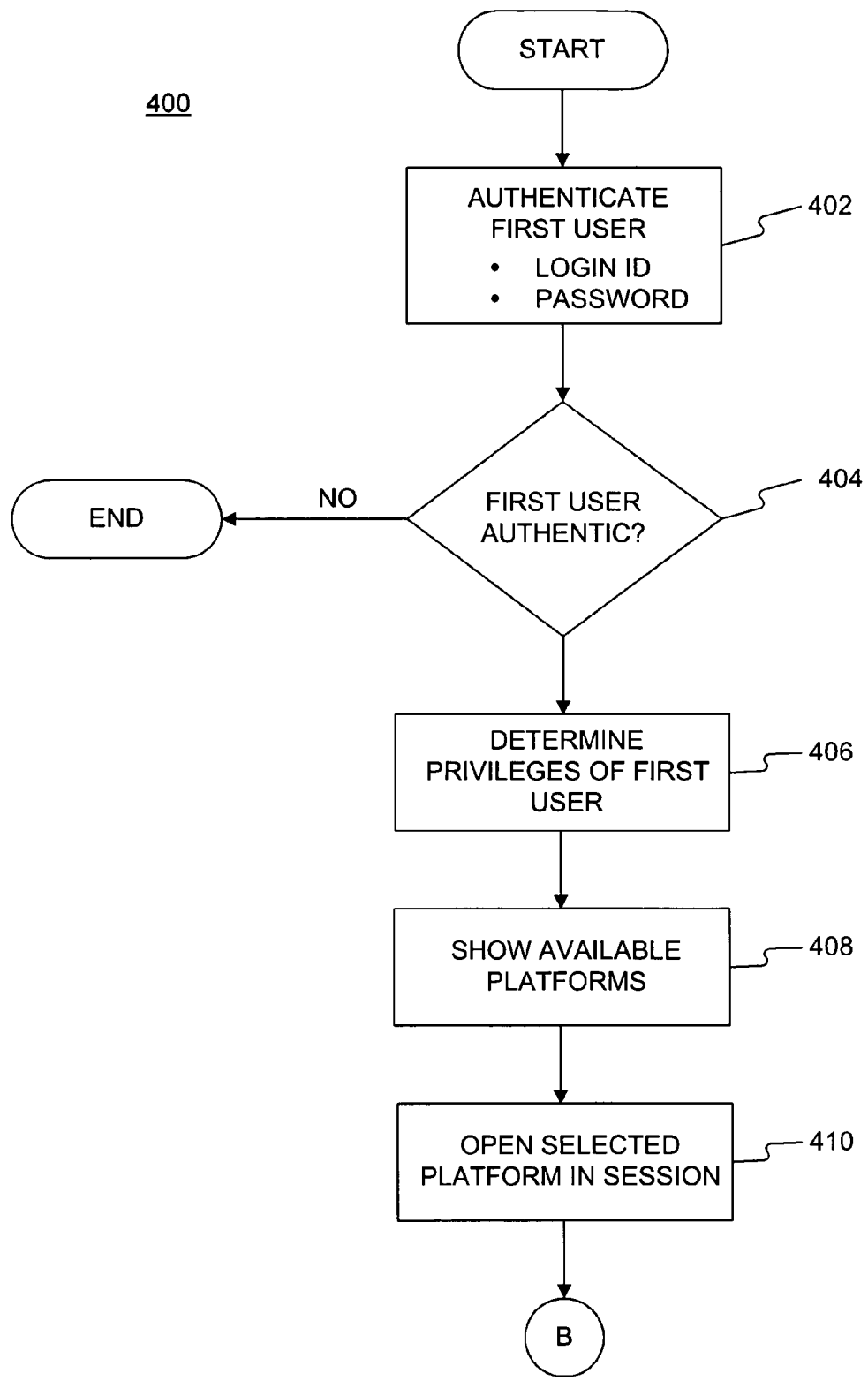
FIG. 4A and FIG. 4B are a flow diagram of a process for authenticating a first user and a shadow user consistent with the invention.
Figure 4B:
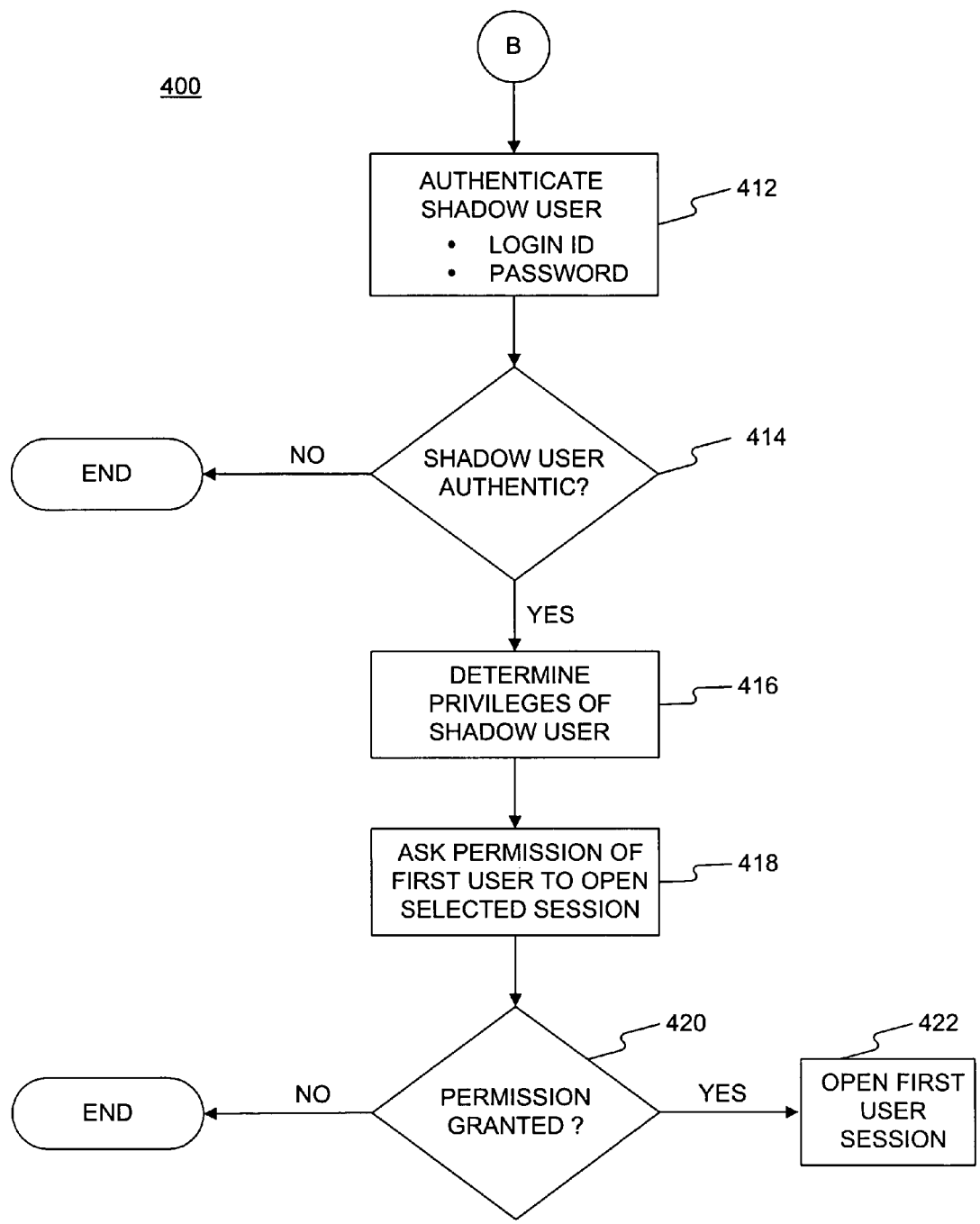

FIG. 4A and FIG. 4B are a flow diagram of a process 400 for authenticating a first user and a shadow user consistent with the invention. In this example, the first user may use terminal 14 and the shadow user may use terminal 16, which may also be called the shadow terminal. First, authentication server 216 authenticates a first user (an end user using workstation 14, for example) (step 402). Authentication may require a login ID or username and a password, for example. If authentication server 402 successfully authenticates the first user (step 404), then process 400 moves on to step 406. Otherwise (step 404), process 400 ends. The first user may belong to one of many "communities." A community is, for example, a group of employees or customers from a single employer, such as Texas Instruments. Another community may be a group of employees or customers from a different employer, such as Intel.

Once the first user is authenticated, user management server 214 determines the privileges of the first user (step 406). The privileges of the first user may depend on, for example, the community to which the user belongs or the identity of the user himself. Different "platforms" may be available to the first user depending on the privileges of the first user. Each platform, for example, may be associated with a different EVM computer and a different EVM system. For example, the first user may only be allowed to view the platforms associated with the first user's community. Platforms available to the first user may also be limited to platforms that are not being leased to other users at that time or to platforms being leased to the first user at the time. Lease information may be stored by lease management server 210 as described above. Once the first user's privileges are determined (step 406), the available platforms are displayed (step 408). The first user selects an available platform and remote desktop server opens the selected platform in a session (step 410).

Then, authentication server 216 authenticates a shadow user (a supervisor using workstation 14, for example) (step 412). Authentication may require a login ID or username and a password, for example. If authentication server 412 successfully authenticates the shadow user (step 414), then process 400 moves on to step 416. Otherwise (step 414), process 400 ends. Once the shadow user is authenticated (step 412), user management server 214 determines the privileges of the shadow user (step 416). Once the shadow user's privileges are determined (step 406), the available platforms and/or platforms opened as sessions are displayed (step 408). The shadow user may select the platform that the first user previously selected and opened in a session if the session that the first user selected is available to the shadow user given the shadow user's privileges. Steps 402 through 422 of process 400 do not necessarily have to be performed that the that particular order.

The first user has the opportunity to deny access to the shadow user when system 10 asks the first user for permission for the shadow user to access the same session. If the first user grants permission to the shadow user (step 420) then the shadow user may successfully access the previously opened session selected by the first user (step 412). If the first user does not grant permission to shadow user (step 420), the process ends.

Once terminal 14 opens session 302 with desktop 304, the first user may evaluate EVM system 17. The first user may execute test code in EVM computer 19 that evaluates EVM system 17. The first user may monitor and control the test code executing in the EVM computer remotely through desktop 304 appearing in browser 306. Alternatively, or in addition, the first user may transfer test code to EVM system 17 from EVM computer 19 for execution in EVM system 17. The first user may monitor and control the execution of the test code from EVM computer 19 through desktop 304 appearing in browser 306. The shadow user may have the same privileges and be able to do the same things first user. The test code and EVM computer 19 evaluate, including measuring the performance of or demonstrating the capabilities of, EVM system 17. The definition of "evaluate" or "evaluating the performance" includes, but is not limited to, measuring the performance or demonstrating the capabilities of (e.g. for the purposes of training) EVM system 17.

Figure 5:
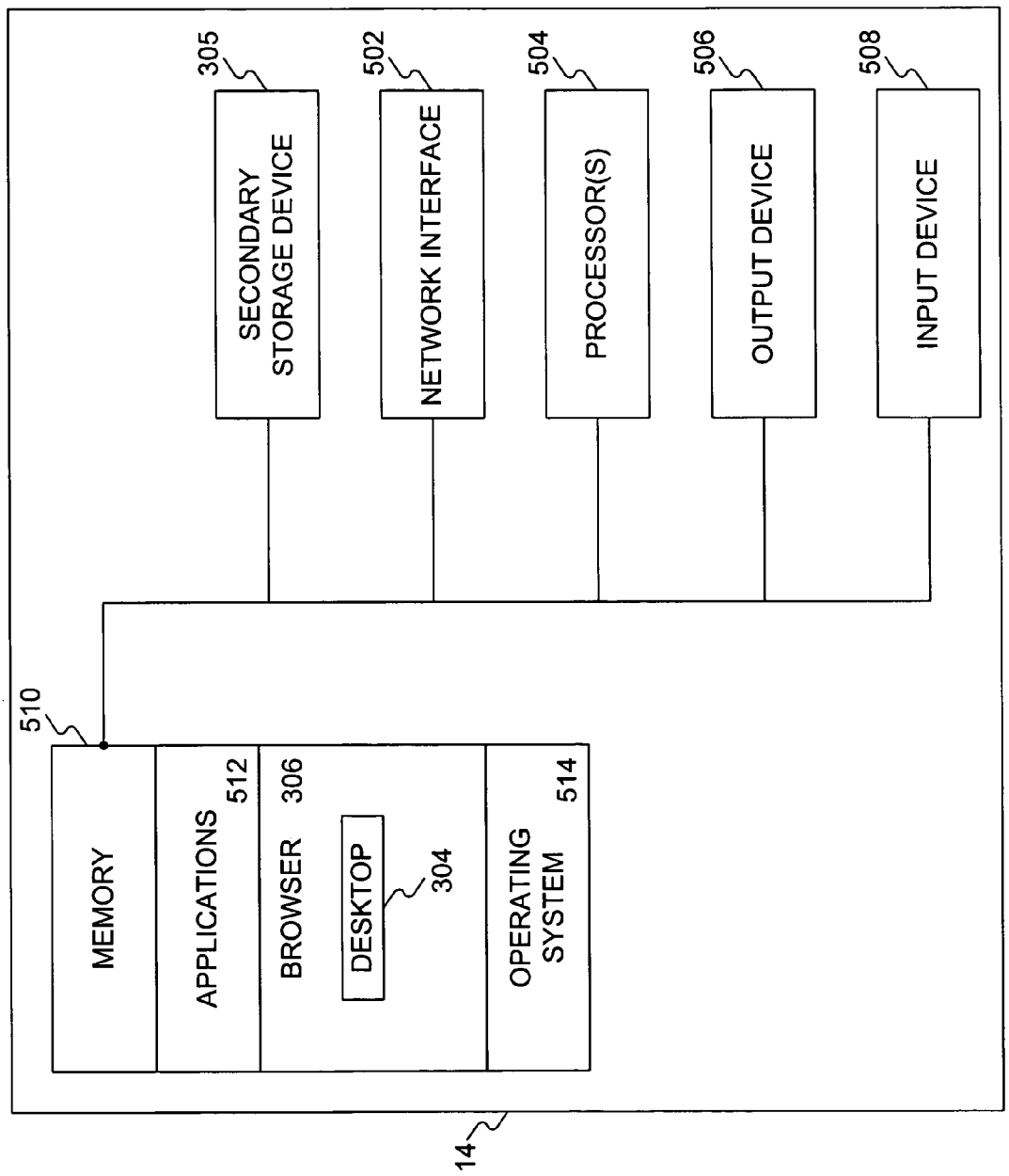
FIG. 5 is a block diagram of an end user terminal consistent with the invention.

FIG. 5 is a block diagram of terminal 14 consistent with the invention. Terminal 14 comprises a memory 510, a secondary storage device 305, a network interface 502, one or more processors 504, an output device 506, and an input device 508. Memory 510 stores applications 512 including a browser 306 and desktop 304. Memory 510 also stores an operating system 514. Terminal 14 can perform the methods and processes described above. Terminals 16 and 18 may also take the form similar to that shown in FIG. 5. Further, web server 202, file server 204, disk array 206, database server 208, lease management server 210, remote desktop server 212, user management server 214, authentication server 216, EVM computer 19, and EVM system 17 may also take the form similar to that shown in FIG. 5.

Figure 6:
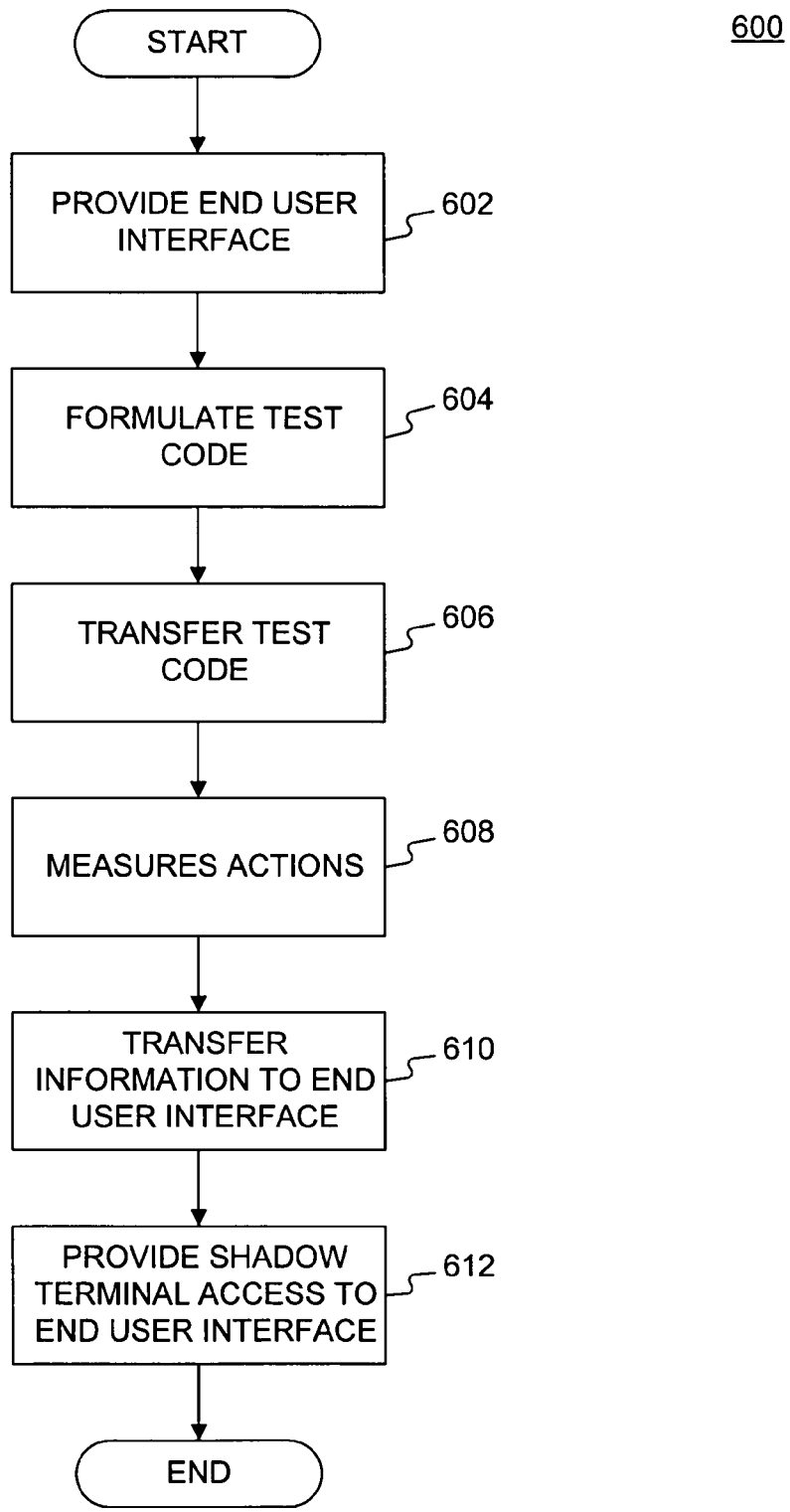
FIG. 6 is a flow diagram of a process 600 for evaluating the performance of a module via the network of FIG. 1.

FIG. 6 is a flow diagram of a process 600 for evaluating the performance of a module via network 100. Process 600 provides an end user interface 304 for enabling end user terminal 14 access over network 100 to evaluation module 17 (step 602). After providing user interface 304, the process formulates test code for evaluation module 17 based on information received from end user interface 304 (step 604). The process transfers the test code to evaluation module 17 (step 606) and measures actions performed by evaluation module 17 to execute the code (step 608). The process then transfers over network 100 to end user interface 304 information indicating a performance of evaluation module 17 based on the measurements of the actions performed by evaluation module 17 (step 610). Further, the process provides shadow end user terminal 16 access to end user interface 304 indicating the performance of the evaluation module. Steps 602 through 612 do not necessarily have to be performed in this order. For example, process 600 may provide shadow terminal access to end user interface 304 (step 612) before formulating test code (step 604) and transferring test code (step 606).

U.S. patent application Ser. No. 10/361,921, entitled "Methods, Apparatus, and Systems for On-line Seminars," assigned to the same assignee as this current application, is hereby incorporated by reference.

Other embodiments of the invention are apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for evaluating a performance of a module via a network, the system comprising:
    a plurality of evaluation modules;
    a plurality of evaluation module computers for evaluating the evaluation modules, the evaluation module computers running end user interfaces for interfacing with the evaluation module computers;
    a server storing membership information of users belonging to communities and rights of the communities to access the plurality of evaluation modules and the plurality of evaluation module computers, the server storing a schedule of when the plurality of evaluation modules and the plurality of evaluation module computers are available for evaluation, the server displaying to a primary user one or more platforms that are accessible by the primary user based on the rights of one or more communities to which the primary user belongs and that are available for evaluation based on the schedule, each platform being a pair of an evaluation module and an evaluation module computer, the server receiving a selection of one of the one or more platforms from the primary user;
    a first terminal linked to the server through the network, the first terminal having a memory storage device, wherein the first terminal displays to the primary user the end user interface running on the selected evaluation module computer of the selected platform and enables the primary user to control the selected evaluation module computer through the network to evaluate the selected evaluation module; and
    a second terminal linked to the server through the network, wherein the second terminal is a shadow terminal operable to display to the shadow user the end user interface displayed at the first terminal and enables the shadow user to control the evaluation module computer of the platform selected by the primary user, and to evaluate the evaluation module of the platform selected by the primary user by shadowing the first terminal, and the second terminal is capable of accessing the memory storage device of the first terminal.

2. The system of claim 1, wherein the server runs a session and the first terminal and the shadow terminal display the end user interface by linking to the session.

3. A method for evaluating a performance of a module via a network, the method comprising: storing, at a server, schedule of when a plurality of evaluation modules and a plurality of evaluation module computers are available for evaluation;
    storing, at the server, membership information of users belonging to communities and rights of the communities to access the plurality of evaluation modules and the plurality of evaluation module computers;
    displaying to a primary user one or more platforms accessible by the primary user based on the rights of one or more communities to which the primary user belongs and available for evaluation based on the schedule, each platform being a pair of an evaluation module and an evaluation module computer;
    receiving a selection of one of the one or more platforms from the primary user;
    running an end user interface on the selected evaluation module computer of the selected platform for interfacing with the selected evaluation module computer, wherein the selected evaluation module computer evaluates the selected evaluation module;
    displaying the end user interface to the primary user on a first terminal linked to the server through the network, the first terminal having a memory storage device;
    enabling the primary user to control the selected evaluation module computer from the first terminal through the network to evaluate the selected evaluation module;
    displaying the end user interface displayed on the first terminal to a shadow user on a second terminal linked to the server through the network, the second terminal having access to the memory storage device of the first terminal; and
    enabling the shadow user to control from the second terminal the evaluation module computer of the platform selected by the primary user and to evaluate the evaluation module of the platform selected by the primary user, wherein the second terminal is a shadow terminal shadowing the first terminal.

4. The method of claim 3, further comprising:
    displaying the end user interface on the first terminal and the shadow terminal by linking the terminals to a session running on the server.

5. A system for evaluating a performance of a module via a network, the system comprising:
    means for storing a schedule of when a plurality of evaluation modules and a plurality of evaluation module computers are available for evaluation;
    means for storing membership information of users belonging to communities and rights of the communities to access the plurality of evaluation modules and the plurality of evaluation module computers;
    means for displaying to a primary user one or more platforms accessible by the primary user based on the rights of one or more communities to which the primary user belongs and available for evaluation based on the schedule, each platform being a pair of an evaluation module and an evaluation module computer;
    means for receiving a selection of one of the one or more platforms from the primary user;
    means for displaying an end user interface running on the selected evaluation module computer of the selected platform to the primary user on a first terminal, the first terminal being linked to the system through the network, the first terminal having a memory storage device;
    means for enabling the primary user to control the selected evaluation module computer from the first terminal through the network to evaluate the selected evaluation module;
    means for displaying the end user interface displayed on the first terminal to a shadow user on a second terminal, the second terminal being linked to the system through the network, the second terminal having access to the memory storage device of the first terminal; and
    means for enabling the shadow user from the second terminal to control the evaluation module computer selected by the primary user and to evaluate the evaluation module selected by the primary user, wherein the second terminal is a shadow terminal shadowing the first terminal.

6. The system of claim 1, wherein
    the server runs a session, and
    the first terminal and the shadow terminal display the end user interface and control the selected evaluation module computer by linking to the session.

7. The system of claim 1, wherein the first terminal opens a session on the server to interface with the selected evaluation module computer, and the shadow terminal connects to the session to display the end user interface and control the selected evaluation module computer.

8. The system of claim 1, wherein the first terminal is operable to open a session on the server to interface with the selected evaluation module computer based on the schedule and the membership information, and the shadow terminal is operable to connect to the session based on the schedule and the membership information.

9. The system of claim 1, wherein the first terminal is operable to open a session on the server to interface with the selected evaluation module computer, and the shadow terminal is operable to connect to the session based on a permission granted by the primary user.

10. The system of claim 1, wherein the first terminal and the shadow terminal are operable to display objects that are graphical or textual.

11. The method of claim 3, further comprising controlling the selected evaluation module computer from the first terminal and shadow terminal by linking the terminals to a session running on the server.

12. The method of claim 3, further comprising displaying the end user interface on the first terminal by opening a session on the server, and displaying the end user interface on the shadow terminal by connecting to the session.

13. The method of claim 3, further comprising opening a session on the server with the first terminal based on the schedule and the membership information, and connecting to the session with the shadow terminal based on the schedule and the membership information.

14. The method of claim 3, further comprising opening a session on the server with the first terminal, and connecting to the session with the shadow terminal based on a permission granted by the primary user.

15. The method of claim 3, further comprising displaying the end user interface on the first terminal and the shadow terminal by displaying objects that are graphical or textual.

* * * * *

UNITED STATES PATENT AND TRADEMARK OFFICE
CERTIFICATE OF CORRECTION

| | | |
|---|---|---|
| PATENT NO. | : 7,984,428 B1 | Page 1 of 1 |
| APPLICATION NO. | : 10/853718 | |
| DATED | : July 19, 2011 | |
| INVENTOR(S) | : Seymour | |

It is certified that error appears in the above-identified patent and that said Letters Patent is hereby corrected as shown below:

Title page, Item (75) Inventor, replace "Brian Seymour" with --William Brian Seymour--

Signed and Sealed this

Twenty-seventh Day of September, 2011

David J. Kappos
*Director of the United States Patent and Trademark Office*